United States Patent
Kamata

(10) Patent No.: US 7,843,765 B2
(45) Date of Patent: Nov. 30, 2010

(54) ATTENUATING A SURFACE SEISMIC WAVE

(75) Inventor: Masahiro Kamata, Kawasaki (JP)

(73) Assignee: WesternGeco L.L.C., Houston, TX (US)

( * ) Notice: Subject to any disclaimer, the term of this patent is extended or adjusted under 35 U.S.C. 154(b) by 652 days.

(21) Appl. No.: 11/836,646

(22) Filed: Aug. 9, 2007

(65) Prior Publication Data

US 2009/0040870 A1 Feb. 12, 2009

(51) Int. Cl.
*G01V 1/00* (2006.01)

(52) U.S. Cl. .................................................... 367/38

(58) Field of Classification Search ................ 367/38, 367/43, 45, 58
See application file for complete search history.

(56) References Cited

U.S. PATENT DOCUMENTS

| | | | | |
|---|---|---|---|---|
| 3,137,363 | A * | 6/1964 | Wolf ............................. | 367/63 |
| 5,274,605 | A * | 12/1993 | Hill .............................. | 367/53 |
| 6,330,512 | B1 * | 12/2001 | Thomas et al. ................. | 702/1 |
| 6,519,205 | B1 * | 2/2003 | Baeten et al. .................. | 367/45 |
| 6,651,007 | B2 * | 11/2003 | Ozbek .......................... | 702/17 |
| 6,791,901 | B1 * | 9/2004 | Robertsson et al. ............ | 367/58 |
| 6,836,448 | B2 * | 12/2004 | Robertsson et al. ............ | 367/59 |
| 6,961,283 | B2 * | 11/2005 | Kappius et al. ................ | 367/43 |
| 7,286,938 | B2 * | 10/2007 | Amundsen et al. ............. | 702/14 |
| 2003/0117894 | A1 * | 6/2003 | Curtis et al. ................... | 367/58 |
| 2007/0104028 | A1 * | 5/2007 | Van Manen et al. ............ | 367/38 |
| 2008/0137478 | A1 * | 6/2008 | Sollner ......................... | 367/51 |
| 2008/0288173 | A1 * | 11/2008 | Saenger ........................ | 702/16 |

OTHER PUBLICATIONS

Kaneda, "Directivity characteristics of adaptive microphone-array for noise reduction (AMNOR)," *J. Acoust. Soc. Jpn.*, 12(4):179-187, 1991.

Knapp, "Geophone differencing to attenuate horizontally propagating noise," *Geophysics*, 51(9)1743-1759, 1986.

Sessler and West, "Second-order gradient unidirectional microphones utilizing an electret transducer," *J. Acoust. Soc. Am.*, 58(1):273-278, 1975.

Shieh and Herrmann, "Ground roll: rejection using polarization filters," *Geophysics*, 55(9):1216-1222, 1990.

* cited by examiner

*Primary Examiner*—Jack Keith
*Assistant Examiner*—Krystine Breier

(57) ABSTRACT

To attenuate a surface seismic wave, seismic sensors having a predetermined orientation with respect to a surface are provided, where the seismic sensors receive seismic waves including a seismic wave reflected from a subterranean structure and the surface seismic wave propagating in at least a first direction that is generally parallel to the surface. A signal that represents a partial derivative of a wavefield containing the surface seismic wave is provided, and the signal is integrated to obtain a response in which the surface seismic wave is attenuated.

22 Claims, 4 Drawing Sheets

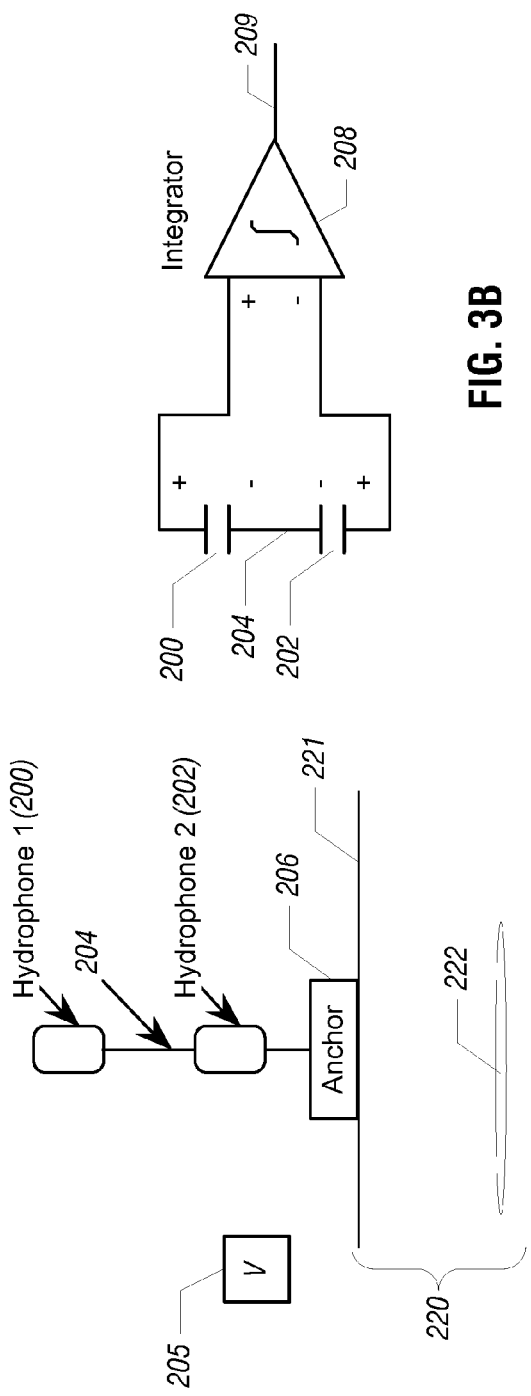
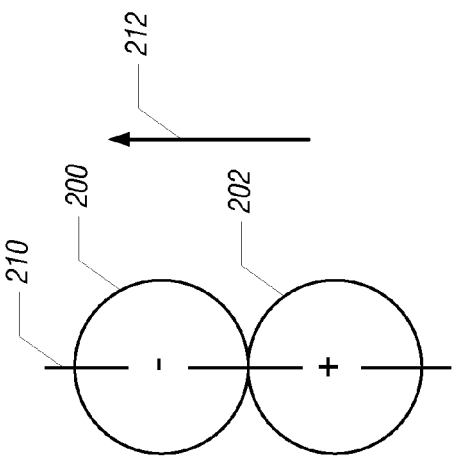
FIG. 3B
FIG. 4
FIG. 3A

FIG. 6A  FIG. 6B

ATTENUATING A SURFACE SEISMIC WAVE

TECHNICAL FIELD

The invention relates generally to attenuating a surface seismic wave that involves providing a signal that represents a partial derivative of a wavefield containing the surface seismic wave, and integrating the signal representing the partial derivative to obtain a response in which the surface seismic wave is attenuated.

BACKGROUND

Seismic surveying is used for identifying subterranean elements, such as hydrocarbon reservoirs, fresh water aquifers, gas injection reservoirs, and so forth. In performing seismic surveying, seismic sources and seismic sensors can be placed at various locations on an earth surface (e.g., a land surface or a sea floor), or even in a wellbore, with the seismic sources activated to generate seismic waves. Examples of seismic sources include explosives, air guns, acoustic vibrators, or other sources that generate seismic waves.

Some of the seismic waves generated by a seismic source travel into a subterranean structure, with a portion of the seismic waves reflected back to the surface (earth surface, sea floor, or wellbore surface) for receipt by seismic sensors (e.g., geophones, hydrophones, etc.). These seismic sensors produce signals that represent detected seismic waves. Signals from the seismic sensors are processed to yield information about the content and characteristics of the subterranean structure.

A portion of a seismic wave generated by a seismic source travels along the surface. If the surface is assumed to be horizontal, then this seismic wave portion travels horizontally along the surface. Such a seismic wave portion is referred to as a surface seismic wave, which is also referred to as ground roll noise.

In one example, as depicted in FIG. 1 (which shows a top view of an arrangement of a seismic source and seismic sensors), multiple lines of seismic sensors (lines 102 and 104) are provided, where each seismic sensor is represented as "G." The seismic source (vibrator) is represented as "V," and is referenced as 100. Each line 102, 104 of seismic sensors is a linear array of geophones in the example. As further depicted in FIG. 1, surface seismic waves 106, 108, and 110 (representing ground roll in different horizontal directions) are depicted.

FIG. 2 illustrates the ground roll surface seismic wave 108 propagating along the direction of a linear array (102 or 104) of geophones (G1-G6), where the source V and geophones G1-G6 are placed on a surface 111 (e.g., land surface or sea floor). Also, FIG. 2 illustrates propagation of seismic waves (116) into a subterranean structure 112 underneath the surface 111. The subterranean structure 112 includes a target reflector 114 (which can be a hydrocarbon reservoir, water aquifer, gas injection zone, etc.). The target reflector 114 reflects seismic waves towards the geophones G1-G6.

In the horizontal direction along the line of the geophones G1-G6, the ground roll seismic wave 108 arrives at the geophones G1-G6 at different times. In other words, the ground roll seismic wave 108 arrives at geophone G1 first, and at geophone G6 last. However, the reflected seismic wave from the target reflector 114 arrives at the geophones G1-G6 almost at the same time (with some small difference).

Summation of the traces represented by signals detected by the individual geophones G1-G6 allows for attenuation of the ground roll surface wave 108 that propagates along the linear direction of the line of geophones G1-G6. However, the linear arrangement of the geophones of FIGS. 1 and 2 does not provide for ground roll attenuation for ground roll seismic waves traveling in the crossline direction (directions 106 and 110) in FIG. 1, where a crossline direction is the direction of wave propagation that is perpendicular to the line of seismic sensors. Ground roll attenuation is not possible or effective with the linear arrangement of geophones as depicted in FIGS. 1 and 2 because the crossline ground roll seismic waves arrive at the geophones at substantially the same time. Moreover, it is not cost-efficient to position additional geophones along the crossline direction, as planting geophones on an earth surface or in a wellbore is a time-consuming and labor-intensive operation.

Another issue associated with a ground roll surface seismic wave is that it exhibits dispersive characteristics (different velocities at different seismic signal frequencies), which can make attenuation difficult. Also, the ground roll surface seismic wave can continuously change its form due to dispersion as the seismic wave propagates.

Moreover, even in the linear direction of a line of seismic sensors, a relatively large number of seismic sensors usually have to be provided in the linear array due to the relatively high velocity of the ground roll surface seismic wave. A long linear array of seismic sensors can degrade imaging resolution, because reflected seismic waves may come in at an oblique angle.

SUMMARY

In general, according to an embodiment, a method of attenuating a surface seismic wave includes providing seismic sensors having a predetermined orientation with respect to a surface to receive seismic waves including a seismic wave reflected from a subterranean structure and the surface seismic wave propagating in at least a first direction that is generally parallel to the surface. The method further includes providing a signal that represents a partial derivative of a wavefield that contains the surface seismic wave, and integrating the signal to obtain a response in which the surface seismic wave is attenuated.

Other or alternative features will become apparent from the following description, from the drawings, and from the claims.

BRIEF DESCRIPTION OF THE DRAWINGS

FIG. 3A shows an arrangement of a gradient hydrophone that has first and second hydrophones in a vertical arrangement, in accordance with an embodiment.

FIG. 3B is a schematic diagram of the hydrophones of FIG. 3A along with circuitry to process a signal from the gradient hydrophone of FIG. 3A.

FIG. 4 illustrates the directivity of the vertical array of hydrophones of FIG. 3A.

FIG. 6A illustrates an areal gradient geophone that has geophones arranged in a mesh arrangement, according to a further embodiment.

FIG. 6B is a schematic diagram of the geophones of FIG. 6A and associated circuitry to process signals from the geophones of FIG. 6A, according to the further embodiment.

DETAILED DESCRIPTION

Figure 2:
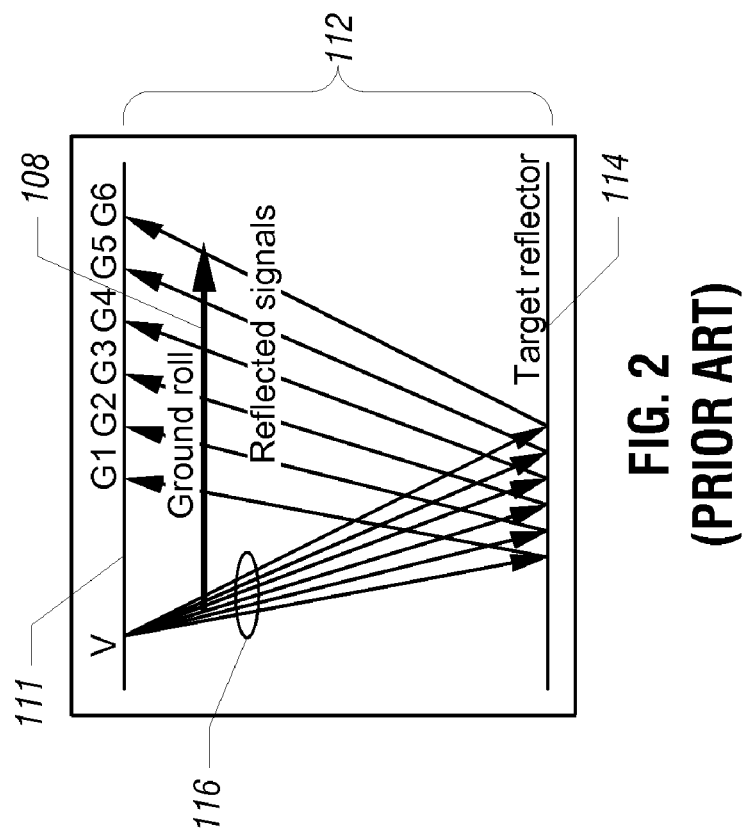
FIGS. 1 and 2 illustrate a conventional arrangement of a seismic source and seismic sensors.
Figure 1:
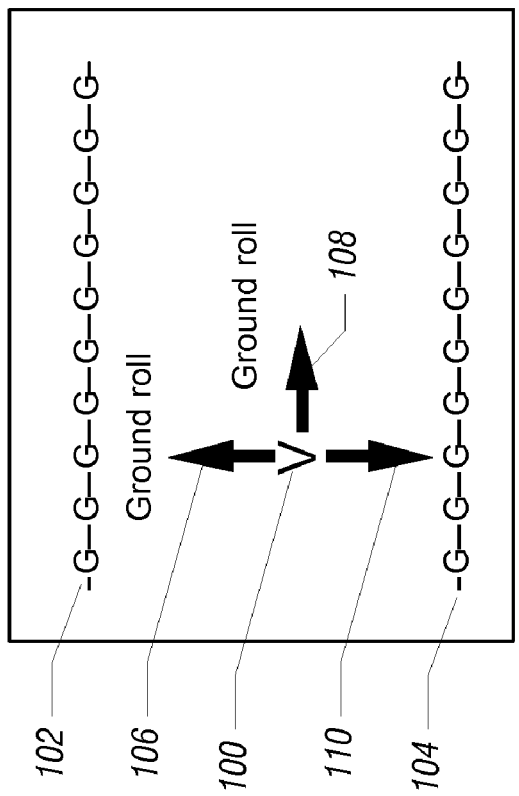

In the following description, numerous details are set forth to provide an understanding of the present invention. However, it will be understood by those skilled in the art that the present invention may be practiced without these details and that numerous variations or modifications from the described embodiments are possible.

In the ensuing discussion, reference is made to "vertical" arrangements of seismic sensors (such as geophones and/or hydrophones), and surface seismic waves that propagate in the horizontal direction (along a horizontal earth surface such as a land surface or sea floor). However, it is noted that reference to "vertical" and "horizontal" is provided for the purpose of easier understanding. If the earth surface does not have a horizontal orientation, then reference to "vertical" and "horizontal" would actually refer to different orientations than true vertical and horizontal orientations. For example, if the earth surface is slanted, then a "vertical" arrangement of seismic sensors would actually refer to an arrangement of seismic sensors along an orientation or direction that is generally perpendicular to the earth surface. Similarly, if the earth surface is slanted, then a "horizontal" surface seismic wave is considered to travel in the direction that is generally parallel to the earth surface. This is true also for sensors placed in a wellbore, which can be vertical, deviated, or horizontal. The terms "generally perpendicular" and "generally horizontal" are used because an earth surface is generally not perfectly flat, but can have various dips, ridges, and slants. Thus, the terms "generally perpendicular" and "generally parallel" refer to the fact that when taken as a whole, and ignoring local fluctuations, the perpendicular and parallel orientations are substantially applicable.

In accordance with some embodiments, several different arrangements of seismic sensors can be provided, including a gradient hydrophone arrangement that includes a vertical arrangement of hydrophones; a vertical gradient geophone arrangement that includes a vertical arrangement of geophones; and an areal gradient geophone arrangement that includes geophones arranged in a differential mesh. Each of the different arrangements of seismic sensors produces a signal that represents a gradient or partial derivative (first-order or second-order partial derivative) of a wavefield containing a surface seismic wave in at least a first direction. With the gradient hydrophone arrangement, the signal produced represents a first-order partial derivative of a wavefield that contains the surface seismic wave. With each of the vertical gradient geophone and areal gradient geophone arrangements, the signal produced represents a second-order partial derivative of a wavefield that contains the surface seismic wave.

A "surface seismic wave" refers to a seismic wave that travels along a horizontal direction that is generally parallel to the earth surface (or surface of a wellbore). The surface seismic wave represents ground roll noise, which is typically insensitive to the presence of target reflectors in a subterranean structure.

In accordance with some embodiments, the signal that represents the partial derivative of the wavefield that contains a surface seismic wave produced by an arrangement of seismic sensors is integrated to produce a response that is attenuated as a function of velocity of the surface seismic wave. As discussed further below, the velocity of the surface seismic wave is relatively large, such that the integration performed on the signal produced by one of the arrangements of seismic sensors allows for attenuation of the surface seismic wave.

A one-dimensional surface seismic wave propagating in an x direction (which is the direction of propagation of the surface seismic wave) may be represented as:

$$s = \alpha \sin(kx - \omega t), \quad (\text{Eq. 1})$$

where
  $\alpha$: amplitude
  $k$: wave number
  $\omega$: angular frequency
  $x$: coordinate (a dimension along which a seismic wave propagates)
  $t$: time.

The partial derivative of Eq. 1 with respect to coordinate x gives:

$$\frac{ds}{dx} = ak\cos(kx - \omega t). \quad (\text{Eq. 2})$$

As discussed further below, this partial derivative $$\frac{ds}{dx}$$

(or a second-order partial derivative $$\frac{d^2 s}{dx^2})$$

is provided by one of the gradient hydrophone, vertical gradient geophone, and areal gradient geophone arrangements.

The integration (over time t) of the partial derivative of Eq. 2 gives:

$$\int \frac{ds}{dx} dt = \frac{a}{c} \sin(kx - \omega t), \quad (\text{Eq. 3})$$

where c is the velocity of the wave propagation defined as $c = \omega/k$. The response given by the time integration of the partial derivative of wave propagation is inversely proportional to the velocity c. Thus, the response given by Eq. 3 can be considered a response provided by a velocity filter that attenuates higher velocity surface seismic waves (waves having higher c) that are due to ground roll noise.

FIG. 3A shows the gradient hydrophone arrangement that includes a vertical arrangement of a first hydrophone 200 and a second hydrophone 202 that are interconnected by an interconnection cable 204. The hydrophones 200 and 202 can include floating devices to allow the hydrophones to float in a body of water (assuming deployment in a marine environment). An anchor 206 is provided to maintain the vertical arrangement of hydrophones on a sea floor. If the gradient hydrophone arrangement is provided on land, however, then the anchor 206 can be omitted, with the hydrophones 200 and 202 provided on some fixed structure to allow them to be vertically oriented. Note that it may also be possible to provide the gradient hydrophone arrangement in a wellbore.

The arrangement of hydrophones 200, 202 are provided on a surface 221. A subterranean structure 220 is located below the surface 221, and a target reflector 222 (e.g., hydrocarbon reservoir, fresh water aquifer, gas injection reservoir, etc.) is located in the subterranean structure 220. Seismic waves propagated into the subterranean structure 220 by a seismic source 205 is reflected by the target reflector 222 back towards the hydrophones 200, 202. The measured signals at the hydrophones 200, 202 are processed to characterize the elements in the subterranean structure 220.

The two hydrophones 200, 202 are provided to have opposite phases, as depicted in the schematic diagram of FIG. 3B. FIG. 3B shows the hydrophones 200 and 202 connected electrically in series, with the negative terminals of the hydrophones 200 and 202 connected to each other and the positives terminals of the hydrophones 200 and 202 connected to inputs of a processing circuit 208 (which can be an analog or digital integrator). The series connection with the polarities of the hydrophones flipped provides for the opposing phases of the hydrophones in the electrical arrangement represented by FIG. 3B. The positive terminal of the hydrophone 200 is connected to a positive input of the integrator 208. The positive terminal of the hydrophone 202 is connected to the negative input of the integrator 208. The output signal produced by the arrangement of hydrophones 200 and 202 (and provided across the inputs of the integrator 208) represents a partial derivative of a wavefield that contains the surface seismic wave. The integrator 208 integrates this output signal of the arrangement of hydrophones 202, 204 over time, according to Eq. 3, to produce a response at an output 209 of the integrator 208 in which the surface wave effect is attenuated.

As further depicted in FIG. 4, the hydrophones 200 and 202 can be collectively considered a dipole having the electrical directivity shown in FIG. 4. The array of hydrophones has an array axis 210 that extends in the vertical direction in the orientation of FIG. 4. A seismic wave that propagates at an angle with respect to the array axis 210 is considered to be a unidirectional propagation along the array axis 210 that travels at an apparent velocity that is greater than the actual or physical velocity of the seismic wave.

When a seismic wave propagates at an angle θ (measured from the array axis 210) with respect to the vertical array, the apparent velocity is increased by 1/cos(θ) compared to the wave propagation in vertical array axis 210. The amplitude of the wave is reduced by cos(θ). The apparent velocity of a horizontally propagating wave (90° with respect to the array axis 210) is infinite for the vertical array, since cos(90°) is zero. Thus, the directivity of the gradient hydrophone is "dipole" as shown in FIG. 4. Since the seismic surface wave (ground roll noise) propagates in a direction that is substantially perpendicular to the array axis 210, then the apparent velocity c of the surface seismic wave is large (approaching infinity), such that the integration according to Eq. 3 performed by the integrator 208 attenuates or eliminates the seismic surface wave.

The slowest signal to the gradient hydrophone is the reflected signal from the target reflector 222 in the subterranean structure 220 (FIG. 3A), since this reflected wave travels in a direction that can be generally or substantially parallel to the array axis 210. Moreover, it is seen that the response of the array is negative for the wave propagating in the opposite direction (direction opposite the arrow 212 in FIG. 4 from the positive terminal of the dipole to the negative terminal), since the apparent velocity becomes negative. The seismic wave travels in the opposite direction when it is reflected downwardly from the water surface, for example. This means that the negative reflection of seismic waves adds more energy to detected signals at the hydrophones 200, 202 when the wavefield is detected near the water surface (at a distance from the water surface less than a quarter wavelength, for example).

An alternative arrangement is the vertical gradient geophone arrangement. Note that a geophone responds to particle motion of the media (in this case the subterranean structure or water), as opposed to responding to pressure as performed by a hydrophone. The negative reflection from the earth surface causes positive particle motion. To utilize the surface reflected energy (due to seismic wave reflected from the surface), the second-order partial derivative is considered. The second-order partial derivative with respect to the x coordinate of Eq. 1 is:

$$\frac{d^2 s}{dx^2} = -k^2 \sin(kx - \omega t). \tag{Eq. 4}$$

Double integration of the second-order partial derivative in time gives the output from the vertical gradient geophone as:

$$\int\int \frac{d^2 s}{dx^2}(dt)(dt) = -\frac{a}{c^2}\sin(kx - \omega t). \tag{Eq. 5}$$

Figures 5A, 5B:
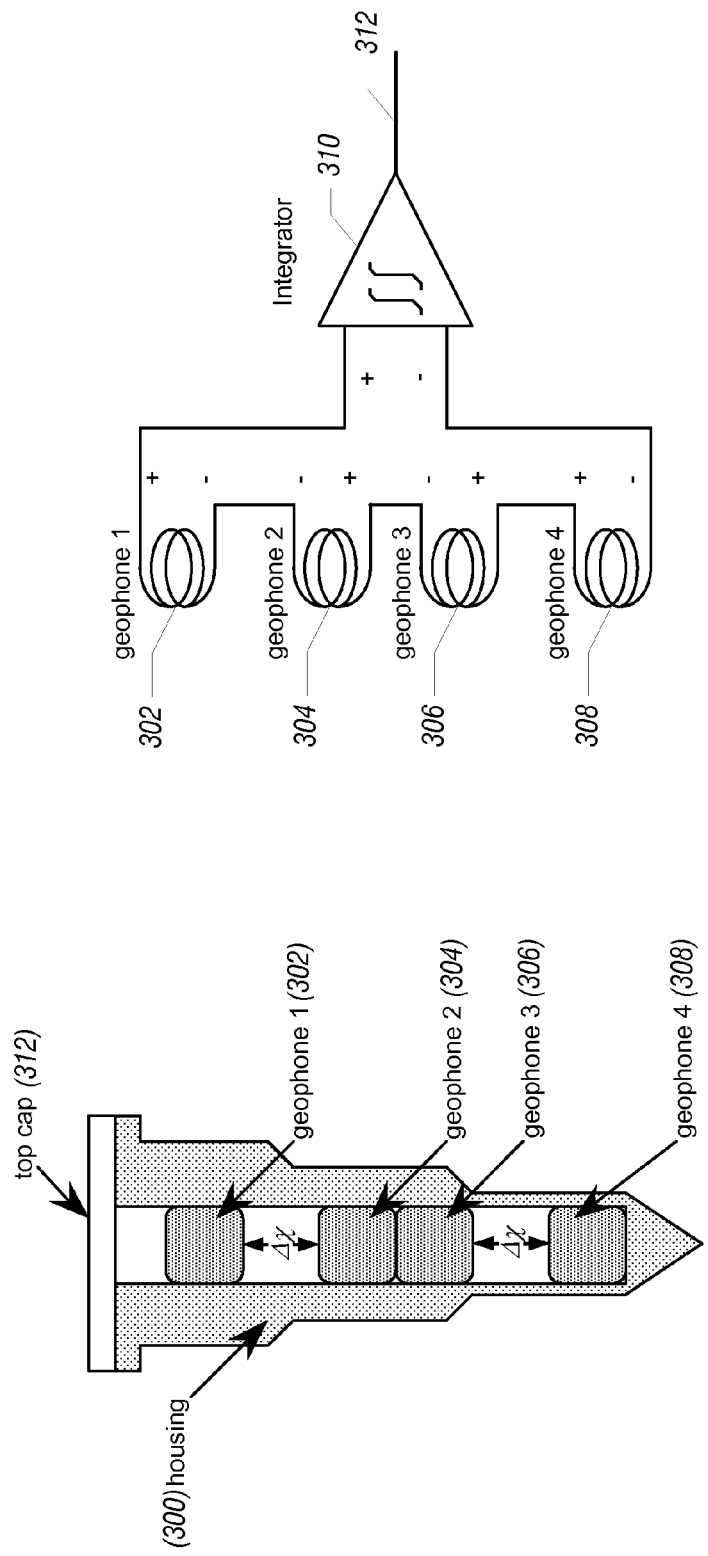
FIG. 5A illustrates an arrangement of geophones that provide a vertical gradient geophone, according to another embodiment.
FIG. 5B is a schematic diagram of the geophones of FIG. 5A and associated circuitry to process a signal from the array of geophones, according to an embodiment.

The negative velocity appears in positive sign because of the square function. The second-order partial derivative can be written in differential equation form as:

$$\frac{d^2 s_i}{dx^2} = \frac{s_{i+1} - 2s_i + s_{i-1}}{(\Delta x)^2}, \tag{Eq. 6}$$

where $s_{i+1}$, $s_i$, $s_{i-1}$ represent signals at the corresponding geophone locations, and $\Delta x$ represents distance between geophones of the vertical gradient geophone arrangement. The second-order partial derivative can be obtained from four geophones vertically planted in the earth. FIG. 5A shows an implementation of such an arrangement, which has geophones 302, 304, 306, and 308 provided in an inner chamber 310 of an outer housing 300. The inner chamber 310 extends in a longitudinal direction of the housing 300 such that the geophones 302-308 are vertically arranged. A top cap 312 is provided to cover the upper end of the housing 300. A first portion of the housing 300 around the top geophone 302 is larger in outer diameter than a second portion of the housing 300 around lower geophones 304, 306, 308 so that planting the assembly in a surface provides good coupling for the four geophones. The geophone 302 provides the signal $s_{i+1}$, the geophones 304, 306 provide signal $s_i$, and the geophone 308 provides signal $s_{i-1}$. The two geophones 304, 306 are connected in series in the middle to obtain the $2s_i$ component of Eq. 6.

FIG. 5B shows a schematic diagram that depicts the electrical connection of the geophones 302, 304, 306, and 308. The four geophones are connected in series, with the polarities of geophones 304 and 306 opposing the polarities of geophones 302 and 308. The positive terminal of geophone 302 is connected to the positive terminal of a double integrator 310, while the negative terminal of geophone 308 is connected to the negative terminal of the double integrator 310. The output of the four geophones connected in series represents a spatial (second-order) derivative according to Eq. 6, which is integrated twice with respect to time by the integrator 310, which can perform either an analog integration or digital integration. The arrangement provided by FIGS. 5A and 5B can remove surface seismic waves that propagate horizontally in any direction at any velocity, since they arrive at a geophone in the vertical array at about the same time. The response provided at the output 312 of the integrator 312 has an attenuated surface seismic wave effect.

Another alternative arrangement is the areal gradient geophone arrangement, as depicted in FIG. 6A. A benefit of the arrangement of FIG. 6A is that the sensors do not have to be implanted in the surface, but rather, the sensors can be provided in the mesh arrangement on the surface. In one example, the five geophones of the example areal gradient geophone arrangement are planted to form a differential mesh arrangement. The geophones are geophones G1, G2, G3, G4, and G5, where geophone G5 is the center geophone spaced apart from each of geophones G2 and G4 by $\Delta x$, and the center geophone G5 is spaced apart from each of geophones G1 and G3 by $\Delta y$. As depicted in FIG. 6B, geophones G1, G2, G3, and G4 are connected in series, while geophone G5 is provided separately from geophones G1-G4.

Note that in this arrangement, two horizontal directions, x and y, are considered, such that the wave propagation on the ground surface is represented as:

$$s = \alpha \sin(k_x x + k_y y - \alpha x), \quad \text{(Eq. 7)}$$

where $k_x$ and $k_y$ are wave numbers in the x and y directions, respectively. Double integration of second-order partial derivatives of Eq. 7 in time gives the output from the vertical gradient geophone as:

$$\left[ \int\int \left( \frac{\partial^2 s}{\partial x^2} + \frac{\partial^2 s}{\partial y^2} \right)(dt)(dt) \right]_{x=0} = -\frac{a}{c^2} \sin(-\omega t). \quad \text{(Eq. 8)}$$

The denominator is a square of the absolute velocity, c, in the (x,y) plane and is no longer a function of direction on the (x-y) plane.

The output signals of geophones G1-G4 are $s_{i+1,j}$, $s_{i,j+1}$, $s_{i-1,j}$, and $s_{i,j-1}$, respectively, while the output signal of geophone G5 is $s_{i,j}$. The second-order partial derivatives in the x and y directions are represented as $$\frac{\partial^2 s}{\partial x^2} \text{ and } \frac{\partial^2 s}{\partial y^2}.$$

The sum of these second-order partial derivatives can be computed as follows:

$$\frac{\partial^2 s_i}{\partial x^2} + \frac{\partial^2 s_i}{\partial y^2} = \frac{s_{i+1,j} + s_{i,j+1} - 4s_{i,j} + s_{i-1,j} + s_{i,j-1}}{(\Delta x)^2}, \quad \text{(Eq. 9)}$$

The summing of the signals $s_{i+1,j}$, $s_{i,j+1}$, $s_{i-1,j}$, and $s_{i,j-1}$ is performed by the series arrangements of G1-G4 in FIG. 6B. The series of geophones G1-G4 are connected to the inputs of a buffer 502 (which is basically a unity gain amplifier). The positive terminal of the geophone G1 is connected to the positive input of the buffer 502, whereas the negative input of the geophone G4 is connected to the negative input of the buffer 502.

The outputs of the geophone G5 are connected to the inputs of an amplifier 504 (which is a 4x amplifier). The output of the buffer 502 is provided to the positive input of an integrator 506, while the output of the 4x amplifier 504 is provided to the negative input of the integrator 506. The integrator 506 is a double integrator, which can perform analog integration or digital integration. The outputs of circuits 502 and 504 form the sum $$\frac{\partial^2 s_i}{\partial x^2} + \frac{\partial^2 s_i}{\partial y^2}$$

according to Eq. 9. The double integration over time performed by the double integrator 506 provides the double integration according to Eq. 8.

Note that according to FIG. 6B, two acquisition channels are involved, a first channel for summing the signals of geophones G1-G4, and a second channel for geophone G5. A gain adjustment circuit 508 is provided to adjust the gain of the output of the integrator 506. This adjustment is performed since amplitude suppression is a function of velocity. The areal gradient geophone arrangement can remove waves propagating in any direction at one velocity. The output of the gain adjustment circuit 508 is provided to the negative input of an amplifier 510, while the output of the buffer 502 is connected to the positive input of the amplifier 510. The output 512 of the amplifier 510 is a response with surface seismic waves attenuated.

Note that S1=(G1+G2+G3+G4)=($s_{i+1,j}$+$s_{i,j+1}$+$s_{i-1,j}$+$s_{i,j-1}$) represents the upgoing seismic wave (reflected from a target reflector in the subterranean structure), in which ground roll noise has been attenuated. Also, S2=(G1+G2-4×G5+G3+G4)=($s_{i+1,j}$+$s_{i,j+1}$-4$s_{i-1,j}$+$s_{i,j-1}$) represents just the ground roll noise (without the upgoing seismic wave present).

The output signal at 512 in FIG. 6B is represented as:

$$\text{sig} = (S1 - \text{weight} \times S2), \quad \text{(Eq. 10)}$$

where weight is the adjustment applied by the adjustment circuit 508 of FIG. 6B, and S1−weight×S2 removes any leftover ground roll noise in S1.

In a different implementation, if S1 and S2 are digital signals, then Eq. 10 can be performed with an adaptive filter, such as a least means square (LMS) filter:

$$\text{sig} = \text{LMS}(S1, S2). \quad \text{(Eq. 11)}$$

Figure 6C:
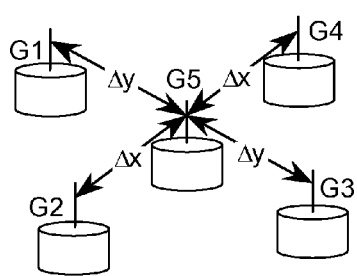
FIG. 6C is a schematic diagram of the geophones of FIG. 6A and associated circuitry to process signals from the geophones of FIG. 6A, according to an alternative further embodiment.
Figure 6C:
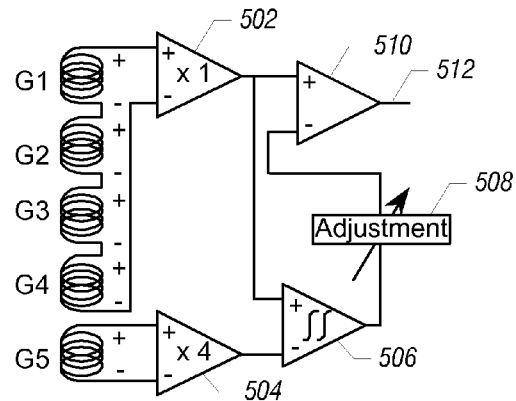
Figure 6C:
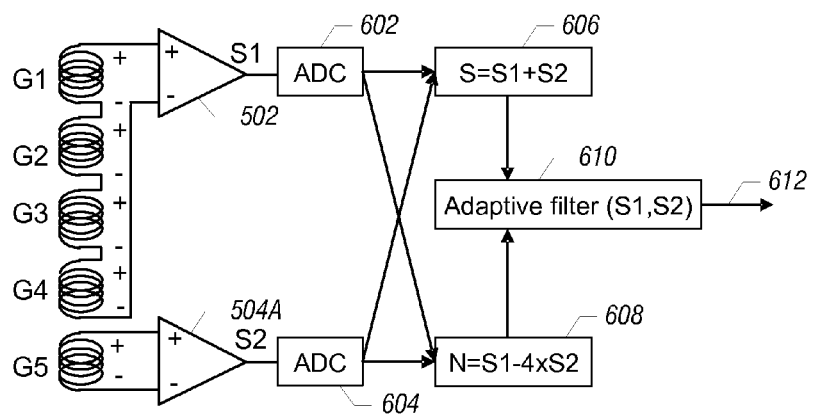

FIG. 6C is a schematic diagram of an alternative circuit using outputs of the G1-G5 geophones of FIG. 6A. In FIG. 6C, geophones G1-G4 are arranged in series, like geophones G1-G4 of FIG. 6B. The buffer 502 of FIG. 6C performs unity amplification. However, the outputs of geophone G5 are provided to a unity gain amplifier (buffer) 504A (instead of the 4x amplifier 504 of FIG. 6B). The output of the buffer 502 is S1 and the output of buffer 504A is S2. S1 and S2 are provided through respective analog-to-digital converters 602 and 604. The outputs of the analog-to-digital converters 602 and 604 are provided to a first summing circuit 606 (which is a digital summing circuit) to produce a sum that is S1+S2. The outputs of the analog-to-digital converter 602 and 604 are also provided to another digital summing circuit 608 to calculate the sum N=S1−4×S2. The output of the summing circuits 606 and 608 are provided to an adaptive filter 610, such as an LMS filter. The output 612 of the adaptive filter 610 represents upgoing seismic waves (reflected from the target reflector) with ground roll noise attenuated.

Thus, according to some embodiments discussed above, various arrangements of seismic sensors are provided to enable seismic surface waves to be attenuated without provision of relatively large numbers of seismic sensors, which can be time-consuming and labor-intensive to deploy.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of attenuating a surface seismic wave, comprising:
   providing seismic sensors having a predetermined orientation with respect to a surface to receive seismic waves including a seismic wave reflected from a subterranean structure and the surface seismic wave propagating in at least a first direction that is generally parallel to the surface;
   providing a signal that represents a second-order partial derivative of a wavefield containing the surface seismic wave; and
   performing double integration of the signal to obtain a response in which the surface seismic wave is attenuated.

2. The method of claim 1, wherein providing the seismic sensors having the predetermined orientation comprises providing the seismic sensors in an orientation that is generally perpendicular to the surface, and wherein providing the seismic sensors in the orientation that is generally perpendicular to the surface comprises providing more than two seismic sensors in series.

3. The method of claim 2, wherein providing the seismic sensors in series comprises providing a plurality of geophones in series.

4. The method of claim 2, wherein an output of the seismic sensors provided in series provides the signal.

5. The method of claim 4, further comprising providing a double integrator to receive the output of the series of seismic sensors, wherein the double integrator performs the double integration of the signal over time.

6. The method of claim 1, wherein providing the seismic sensors having the predetermined orientation comprises providing a mesh arrangement of the seismic sensors.

7. The method of claim 6, wherein the mesh arrangement of seismic sensors comprises a center seismic sensor and additional seismic sensors connected to the center seismic sensor.

8. The method of claim 7, wherein signals provided by the additional seismic sensors are summed to provide a sum, and a multiple of a signal provided by the center seismic sensor is subtracted from the sum to provide the second order partial derivative.

9. A method of attenuating a surface seismic wave, comprising:
   providing seismic sensors having a predetermined orientation with respect to a surface to receive seismic waves including a seismic wave reflected from a subterranean structure and the surface seismic wave propagating in at least a first direction that is generally parallel to the surface;
   providing a signal that represents a partial derivative of a wavefield containing the surface seismic wave; and
   integrating the signal to obtain a response in which the surface seismic wave is attenuated,
   wherein providing the seismic sensors having the predetermined orientation comprises providing the seismic sensors in a generally vertical orientation that is generally perpendicular to the surface, wherein the seismic sensors in the generally vertical orientation are generally aligned along a vertical axis with one of the seismic sensors above at least another of the seismic sensors.

10. The method of claim 9, wherein providing the signal that represents the partial derivative of the wavefield containing the surface seismic wave comprises providing the signal that represents the partial derivative with respect to a coordinate in which the surface seismic wave is propagating.

11. The method of claim 10, wherein integrating the signal comprises integrating the signal over time.

12. The method of claim 9, wherein providing the seismic sensors in the generally vertical orientation that is generally perpendicular to the surface comprises providing hydrophones in the orientation that is generally perpendicular to the surface.

13. The method of claim 9, wherein providing the seismic sensors in the generally vertical orientation that is generally perpendicular to the surface comprises connecting the seismic sensors electrically in series, wherein an output of the series of seismic sensors is provided to an integrator to perform the integrating, and wherein the output of the series of seismic sensors provides the signal that represents the partial derivative of the wavefield containing the surface seismic wave.

14. A seismic sensor system, comprising:
   a plurality of seismic sensors having a predetermined orientation with respect to a surface to receive seismic waves including a seismic wave reflected from a subterranean structure and a surface seismic wave propagating in at least a first direction that is generally parallel to the surface;
   a processing circuit to:
      receive a signal based on output of the seismic sensors, wherein the signal represents a second-order partial derivative of a wavefield containing the surface seismic wave, and
      perform double integration of the signal to obtain a response in which the surface seismic wave is attenuated.

15. The seismic sensor system of claim 14, wherein the plurality of seismic sensors are provided as a series of seismic sensors arranged in an orientation that extends along an axis that is generally perpendicular to the surface.

16. The seismic sensor system of claim 15, wherein the plurality of seismic sensors comprise hydrophones having opposing phases.

17. The seismic sensor system of claim 14, wherein the plurality of seismic sensors include three or more seismic sensors in series, wherein the predetermined orientation is generally perpendicular to the surface, wherein the output of the three or more seismic sensors in series is to provide the signal representing the second-order partial derivative, and wherein the seismic sensor system further comprises:
   a double integrator to receive the signal and to perform the double integration.

18. A seismic sensor system, comprising:
   a series of seismic sensors having a predetermined orientation with respect to a surface to receive seismic waves including a seismic wave reflected from a subterranean structure and a surface seismic wave propagating in at least a first direction that is generally parallel to the surface, wherein the series of seismic sensors are arranged in the predetermined orientation that extends along an axis that is generally perpendicular to the surface;

a processing circuit to:
receive a signal based on output of the seismic sensors, wherein the signal represents a partial derivative of a wavefield containing the surface seismic wave, and
integrate the signal to obtain a response in which the surface seismic wave is attenuated, wherein the plurality of seismic sensors are configured to produce at least three output signals, wherein at least two of the output signals are summed to provide a sum and another of the output signals is multiplied by a factor of at least two to provide a subtrahend that is subtracted from the sum to represent the partial derivative.

19. The seismic sensor system of claim 18, wherein the plurality of seismic sensors comprise geophones.

20. The seismic sensor system of claim 18, wherein the plurality of seismic sensors comprise five seismic sensors to produce five corresponding output signals, wherein four of the five output signals are summed to provide the sum, and another of the five output signals is multiplied by a factor of four to provide the subtrahend.

21. The seismic sensor system of claim 18, wherein the plurality of seismic sensors comprise a mesh arrangement of seismic sensors.

22. The seismic sensor system of claim 21, wherein the mesh arrangement of seismic sensors comprises a center seismic sensor and peripheral seismic sensors connected to the center seismic sensor.

* * * * *